United States Patent [19]

Fritsch

[11] Patent Number: 4,814,826
[45] Date of Patent: Mar. 21, 1989

[54] PRINTER FOR THREE DIMENSIONAL LENTICULAR PRINT MATERIAL

[75] Inventor: Robert E. Fritsch, Roswell, Ga.

[73] Assignee: Fototechniek Elite B.V., Amsterdam-Diemen, Netherlands

[21] Appl. No.: 154,855

[22] Filed: Feb. 10, 1988

[51] Int. Cl.⁴ .................. G03B 27/32; G03B 35/14
[52] U.S. Cl. ........................................ 355/22; 355/77
[58] Field of Search ............... 355/22, 43, 66, 77; 353/7

[56] References Cited

U.S. PATENT DOCUMENTS

| | | | |
|---|---|---|---|
| 2,506,131 | 5/1950 | Bonnet | 355/22 |
| 2,554,532 | 5/1951 | Juillet | 355/22 X |
| 3,994,580 | 11/1976 | Hoffman | 355/66 X |
| 4,059,354 | 11/1977 | Lo et al. | 355/22 X |
| 4,101,210 | 7/1978 | Lo et al. | 353/7 |

Primary Examiner—Richard A. Wintercorn
Attorney, Agent, or Firm—Brumbaugh, Graves, Donohue & Raymond

[57] ABSTRACT

A method of effecting a three-dimensional print by a non-scanned exposure of three-dimensional lenticular print material is provided wherein a lenticular print material and a film having a plurality of exposed frames thereon are placed in opposing imaging planes and a lens and a periscope are positioned between the film and the print material; the periscope including first and second parallel mirrors positioned so as to reflect light along an optical path from the film through the lens to the print material, each of the parallel mirrors rotatable about a first axis normal to the lens optical axis and a second axis intersecting the first axis. Each of the frames is placed a predetermined linear distance from an optical axis of the lens to create a plurality of angular exposure zones corresponding respectively to the plurality of the frames and, for each of the plurality of angular exposure zones; the lens is placed in the center of the angular exposure zone; and the frame corresponding to the angular exposure zone is illuminated for delivering an image exposure of the frame to the periscope along the center of the angular exposure zone; thereby removing the translation (offset of) the image exposure delivered to the periscope from the lens along the center of the angular exposure zone from the periscope to the print material by rotating the periscope about the first axis and rotating the periscope about the second axis to restore the optical axis path to its original length.

9 Claims, 2 Drawing Sheets

PRINTER FOR THREE DIMENSIONAL LENTICULAR PRINT MATERIAL

BACKGROUND OF THE INVENTION

The present invention is generally directed to autostereoscopic picture production and in particular to such production employing lenticular print material, whereby a novel method and apparatus are disclosed for composing a three-dimensional print from a number of two-dimensional views of an object field without requiring precise control of the lens-film arrangement.

A known method for composing such prints uses a conventional two-dimensional camera to photograph an object field from different vantage points, thereby producing a negative film whose frames each contain a view of the object field from the respective vantage point at which the frame was exposed. These two-dimensional views are then projected sequentially or simultaneously by an imaging system through a lenticular screen to expose the photosensitive emulsion beneath the lenticules.

In connection with these known three-dimensional printing processes, the lenticular print material employed therewith ordinarily requires each of the frames of the negative film to be exposed within an assigned angular zone. The sum total of all of the angular exposure zones is chosen so as to match what is commonly termed the acceptance angle of the lenticule. This acceptance angle is simply the arcuate zone to which any incoming light must be restricted in order to properly expose the photosensitive material beneath the lenticule. In order to achieve this angular zone exposure, one prior art technique employs a dynamic film-lens arrangement whereby the film and lens move during exposure to continuously scan each frame across its assigned angular exposure zone, commonly known as proportional scanning. A detailed discussion of this method is found in U.S. Pat. No. 4,120,562.

This known angular exposure technique requires precise proportional tracking of the relative motion of the lens and film, as well as minimal amounts of lens distortion in order to provide substantially uninterrupted and nonoverlapping image bands on the lenticular film, while matching the acceptance angle of the lenticular print film. Such dependency upon precise control of the lens-film arrangement subjects this known method to other factors, e.g. vibration, which tend to lessen the quality of the print.

Further disadvantages of prior art composing methods and the machinery used to implement them include difficult and expensive manufacturing and maintenance techniques, as well as frequent calibration and an inherently large size.

SUMMARY OF THE INVENTION

The present invention is directed to a novel method and apparatus for effecting a non-scanned exposure of three-dimensional lenticular print material. The equipment used to implement the method is easily and inexpensively manufactured, requires little maintenance and calibration, is small and compact, and substantially immune to environmental influences such as vibration.

According to one embodiment of the present invention, a method of effecting a three-dimensional print by a non-scanned exposure of three-dimensional lenticular print material is provided wherein a lenticular print material and a film having a plurality of exposed frames thereon are placed in opposing and parallel imaging planes and a lens and a periscope are positioned between the film and the print material. The periscope includes first and second parallel front surfaced mirrors positioned so as to reflect light along an optical path from the film through the lens to the print material, with each of the parallel mirrors being rotatable about a first axis normal (90°) to the optical axis of the lens and a second axis intersecting the first axis.

Each of the frames is placed a predetermined linear distance from the optical axis of the lens to create a plurality of angular exposure zones corresponding to the plurality of the frames while the frame corresponding to the angular exposure zone is illuminated for delivering an image exposure of the frame to the print material along the center of the angular exposure zone. The translation (or offset) of the image exposure delivered by the periscope from the lens along the center of the angular exposure zone is removed by rotating the periscope about the first axis. Rotating the periscope about the second axis restores the optical axis path to its original length.

DETAILED DESCRIPTION OF THE PREFERRED EMBODIMENTS

Figure 1A:
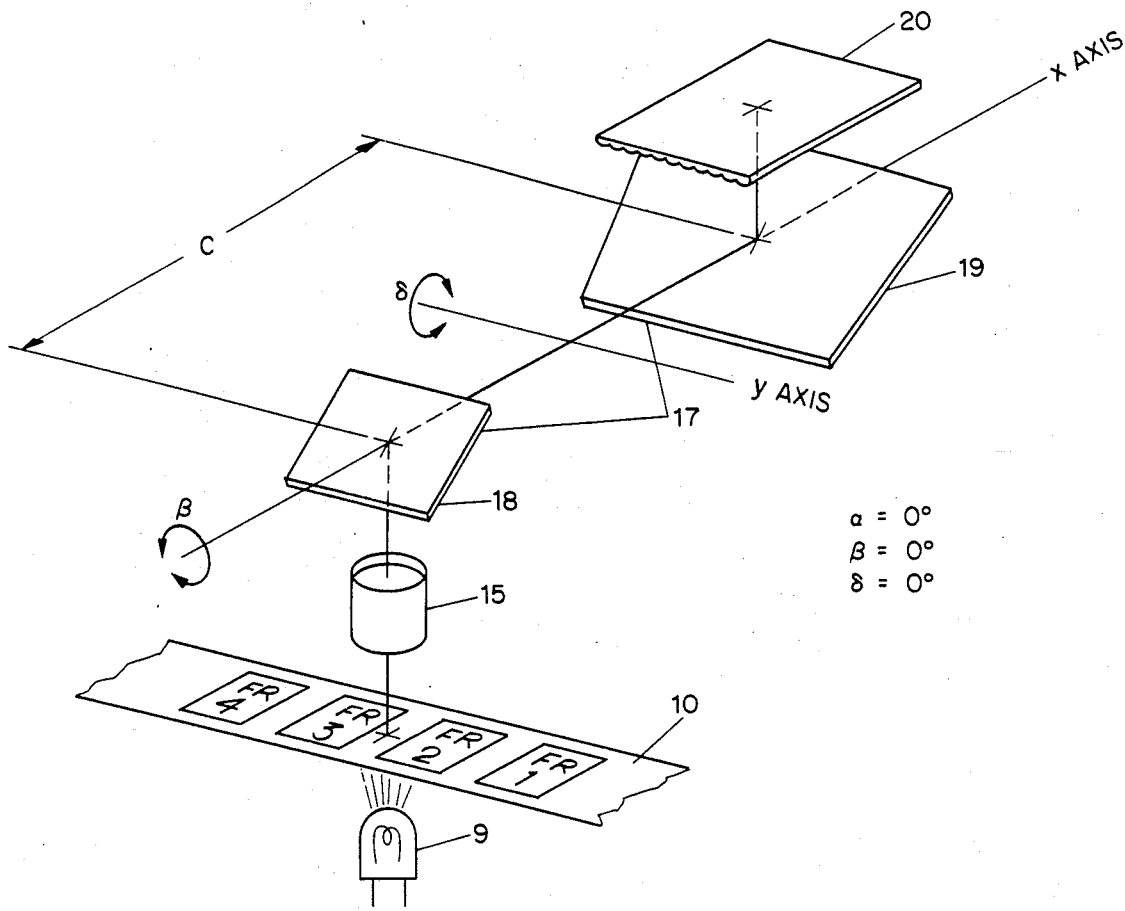
FIG. 1(a) is a schematic assembly view of a print exposure apparatus in accordance with the present invention.

With reference to FIG. 1(a), there is shown an arrangement for effecting a non-scanned exposure of three-dimensional lenticular material in accordance with the present invention. Film 10 is shown with four frames FR1–FR4 thereon. As described hereinbefore, the frames FR1–FR4 represent four images of a photographic scene taken at four spaced horizontal vantage points. Cameras for taking such images are described in U.S. Pat. No. 4,120,562, and the pertinent portions of that patent are herein incorporated by reference.

Figure 1B:
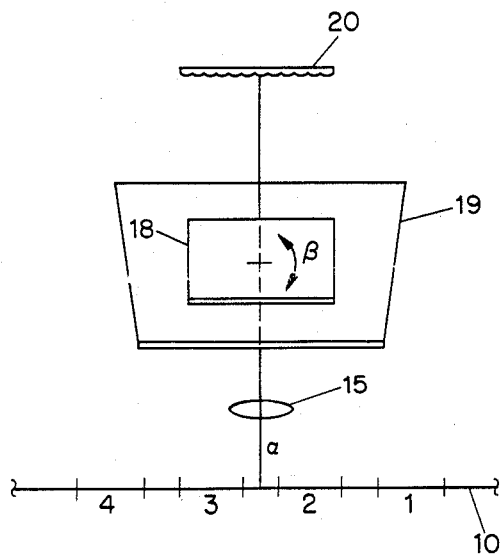
FIGS. 1(b) and (c) are side and rear elevational views of the assembly of FIG. 1(a), respectively.
Figure 1C:
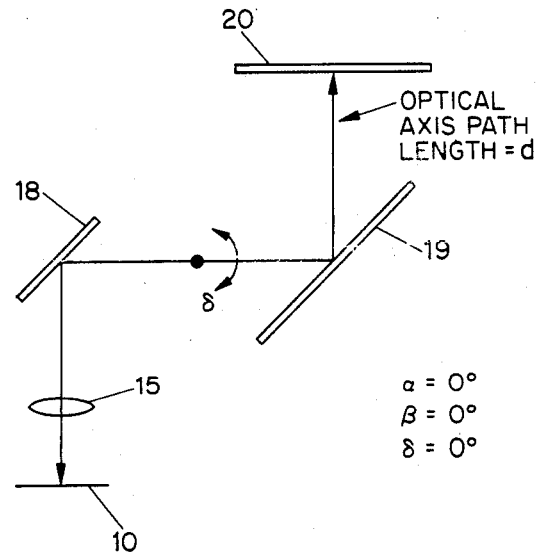
Figure 2:
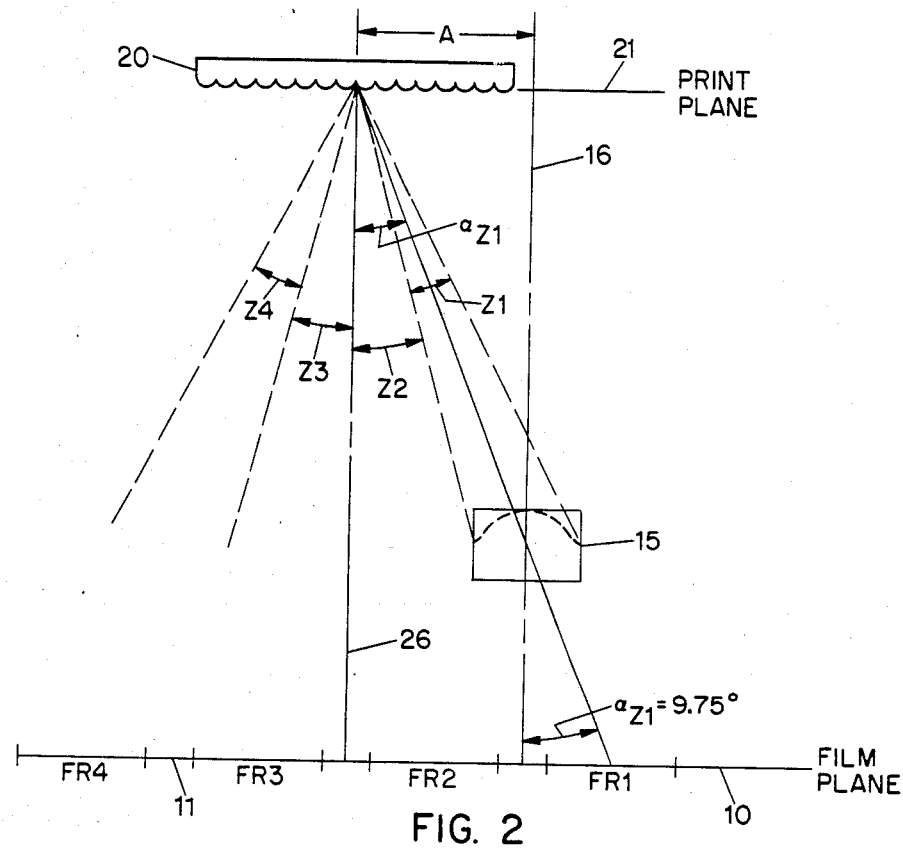
FIG. 2 is a diagram showing the angular exposure zones and optical path offset of an image exposed without the periscope arrangement of the present invention.

As shown in FIG. 2 with reference to FIGS. 1(a)–(c), and particular to frame FR1, each frame is projected so as to deliver light to the print material within assigned angular zones Z1–Z4. It is to be understood that the arcuate sum total of the angular exposure zones is chosen so as to match the aforedescribed acceptance angle of the lenticule, and the division of the total angular exposure zone quantitatively matches the number of vantage points for which film exposures are provided. For instance, if the total angular exposure zone $Z_T$ for all four frames FR1–FR4 is 26°, then each frame must deliver light to print material 20 over a zone approximately equal to 26/4, or 6.5° wide.

This total projection angle of the composing apparatus is chosen in order to match the previously described acceptance angle of the lenticular print film. Further providing various projecting angles allows for composition of the three-dimensional image with substantially uninterrupted and non-overlapping image bands on the lenticular print material. The arrangement shown in FIG. 1 accomplishes this matching without the use of the aforedescribed prior art proportional scanning.

With further reference to FIG. 2, there is shown in dotted-line portion each of the four angular zones Z1–Z4, wherein Z1 represents the exposure zone covering the angular displacement from $+13°$ to $+6.5°$, Z2 the zone covering angular displacement from $+6.5°$ to $0°$, Z3 the zone covering angular displacement from $0°$ to $-6.5°$, and Z4 the zone covering angular displacement from $-6.5°$ to $-13°$, with angular displacement and sign referenced from the optical axis 16 of lens 15, which is parallel with lenticular axis 26.

Four fixed exposures are to be made by placing the frames FR1–FR4 in a relative position with respect to the fixed lens 15 such that the exposure angle is the midpoint of each of the four exposure zones Z1–Z4. For simplification, FIG. 2 shows only the exposure angle $\alpha_{Z1}$, which represents the center of the Z1 exposure zone, each of the other three exposure zones having similarly corresponding exposure angles $\alpha_{Z2}$, $\alpha_{Z3}$ and $\alpha_{Z4}$. In the instant example, if Z1 represents the exposure zone covering angular displacement from $+13°$ to $+6.5°$, then $\alpha_{Z1}$ equals $9.75°$, the center of exposure zone Z1 and, similarly, $\alpha_{Z2}$ equals $+3.25°$, $\alpha_{Z3}$ equals $-3.25°$ and $\alpha_{Z4}$ equals $-9.75°$. Thus, the necessary exposure angles are defined and set by predetermined linear displacements of each frame FR1–FR4 away from the lens optical axis 16.

In a preferred embodiment, a projection illumination lamp 9 illuminates film 10 from below so as direct light towards lens 15, which is a fast enlarging lens having a sufficiently large exit pupil to fill the entire 6.5°-wide exposure zone. A minimum F/1.9 is recommended, as well as additionally shaping the aperture diaphragm in a rectangular fashion as shown in FIG. 3, so as to produce a flat exposure across the entire exposure zone.

Figures 4A, 4B:
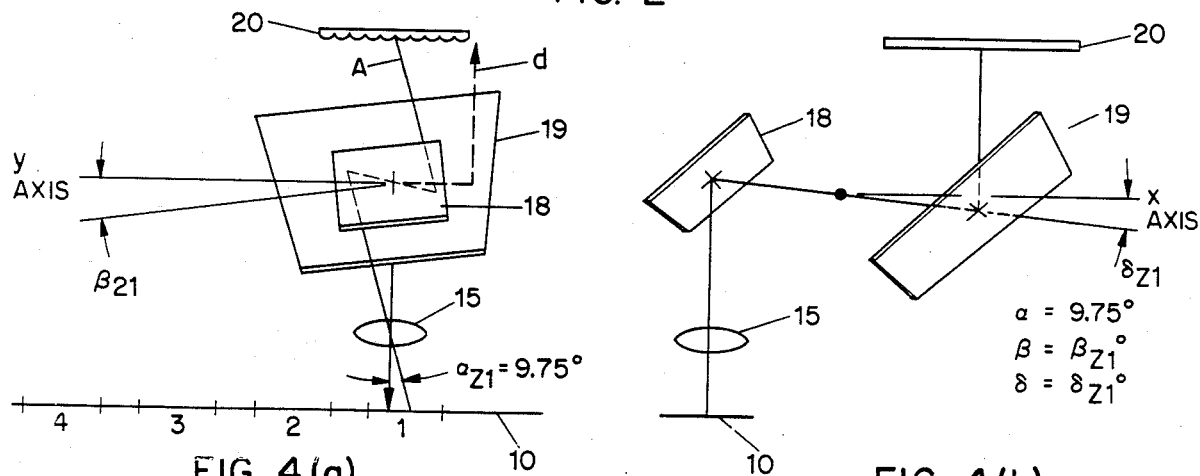
FIGS. 4(a) and (b) are two plan views of the apparatus showing the removal of image offset by the periscope.

It is easily seen that the resultant image at the print plane 21 would be offset from the lens optical axis 16 (system centerline) by a distance A if the exposure were made in a straight enlarging system as shown in FIG. 2. To compensate for this offsetting distance, in accordance with the invention, the light path is folded so that the image is translated back across the optical axis 16 by the first periscope mirror and then delivered to the print material (with the offset removed) by the second mirror. As shown in FIG. 1(a), periscope 17, including horizontally mounted parallel mirrors 18 and 19 interposed between the film 10 and print material 20, provides the appropriate image translation removal while preserving the exposure angle $\alpha_{Z1}$ without any resultant image rotation. This is further illustrated in FIGS. 4(a) and (b), which show the path of the folded light from frame FR1 through lens 15 and periscope 17 to print material 20 in accordance with the instant embodiment of the present invention. Mirrors 18 and 19 are placed so as to focus the image exposed at exposure angle $\alpha_{Z1}$ directly on print material 20 without any image offset. Periscope 17 is rotated about an axis-x in order to remove this image translation without introducing image rotation, while preserving exposure angle $\alpha_{Z1}$. For each exposure angle $\alpha_{Z1}$–$\alpha_{Z4}$, there is a corresponding rotational setting about the x-axis, $\beta_{Z1}$–$\beta_{Z4}$ respectively, which achieves the aforementioned conditional removal of the image translation. In FIG. 4(a), mirrors 18 and 19 of periscope 17 are shown rotated at an angle $\beta_{Z1}$ which removes the image translation and focuses the image onto print material 20 along the optical path A shown in solid line portion. The original optical axis path length d at $\beta_Z=0$, $\beta_Z=0$ is shown in dotted line portion. The means for rotating the periscope 17 are not shown, but it is to be understood any conventional means, such as controllable gear motors which are known per se in the art, for rotating a mirror about an axis will satisfy the rotation requirements of the periscope 17 in accordance with the present invention. Similarly not shown are known means for mounting the fixed lens and displacing the film in a timed relationship.

Figures 3, 5:
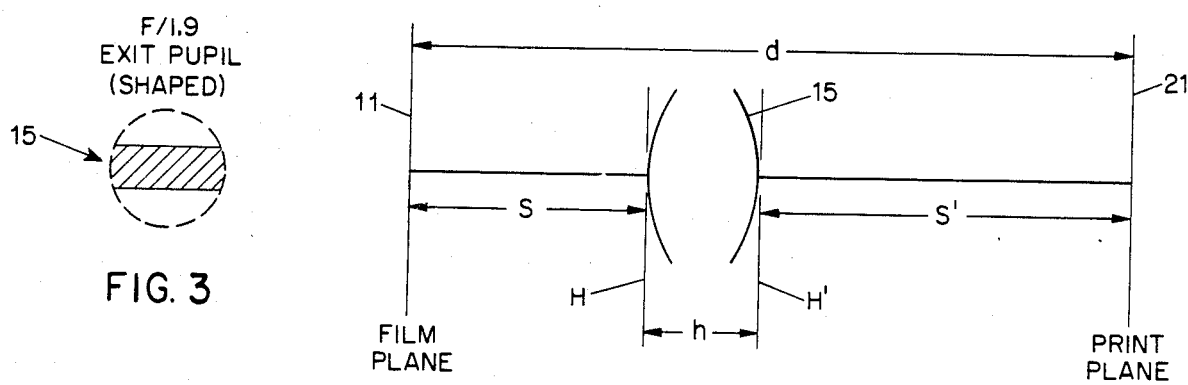
FIG. 3 is a schematic view of a fast enlarging lens with a rectangularly shaped exit pupil used in accordance with the embodiment of FIG. 1(a)
FIG. 5 is a diagrammatic view showing the optical path length components of one embodiment of the invention.

With reference to FIGS. 1(c), 4(b) and 5, further explanation of the image translation described above will be given.

The printer optical axis path length d along each exposure angle $\alpha_{Zn}$ is given by the relationship $$d = S + S' + h \quad (1)$$

where S represents the object distance from film plane 11 to the first principal plane H of the lens 15, S' represents the image distance from the second principal plane H' of the lens 15 to print plane 21, and h represents the distance between the principal planes H and H' of lens 15. If the magnification of the lens is given by $$m = \frac{S'}{S}, \quad (2)$$

by utilizing the simple lens formula $$\frac{1}{f} = \frac{1}{S} + \frac{1}{S'}$$

and substituting into equation (1), the optical path length d is given by the equation:

$$d = f\left(2 + m + \frac{1}{m}\right) + h. \quad (3)$$

When periscope 17 is introduced and rotated about the x-axis to remove the aforementioned image translation, this optical path length will change by a small amount $\Delta d$, as shown in FIG. 4(a).

Each of the periscope angles, $\beta_{Z1}$–$\beta_{Z4}$, produces a corresponding small change $\Delta d$ in path length along the optical axis. Rotation of the periscope about the x-axis causes a shortening of the optical axis path length by a distance $\Delta d = C(1 - \cos\beta)$, where C represents the periscope length along the x-axis. Path length correction is achieved by additionally rotating the periscope about the y-axis. The rotational setting about the y-axis necessary to correct the path length distortion created by the respective periscope angles $\beta_{Z1}$–$\beta_{Z4}$ is termed the corrective tilt angle and is labeled $\delta_{Z1}$–$\delta_{Z4}$. Since the original path length along the optical axis is shortened by a distance $\Delta d = C(1 - \cos\beta)$ as the periscope is rotated through the angle $\beta_{Z1}$, the corrective tilt angle $\delta$ is chosen to add this corrective factor back into the optical path length and the periscope is simultaneously rotated through the angle $\alpha_{Z1}$ to preserve the optical axis path length d, as shown in FIG. 4(b).

Each of the above-mentioned parameters $\alpha$, $\beta$, $\delta$ and $\Delta d$ are interrelated, and developed for each of the angular exposure zones Z1–Z4 according to the following three design equations:

$$\sin \beta = \frac{f(1 + m)}{C} \tan \alpha \qquad (4)$$

$$\delta = 2 \tan^{-1} (\cos \beta) \qquad (5)$$

$$\Delta d = C (1 - \cos \beta) \qquad (6)$$

where $\beta$=periscope angle, $\alpha$=exposure angle, f=lens focal length, m=magnification, C=periscope length, $\delta$=corrective tilt angle, and $\Delta d$=optical path length correction.

The detailed description of the preferred embodiment of the invention having been set forth herein for the purpose of explaining the principles thereof, it is known that there may be modification, variation or change in the invention without departing from the proper scope of the invention and the claims thereto.

I claim:

1. A method of effecting a three-dimensional print by a non-scanned exposure of three-dimensional lenticular print material comprising:
   placing in opposing imaging planes a lenticular print material and a film having a plurality of exposed frames thereon;
   positioning a lens and a periscope between said film and said print material, said periscope including first and second parallel mirrors positioned so as to reflect light along an optical path from said film through said lens to said print material, each of said parallel mirrors rotatable about a first axis normal (90°) to the optical axis of the lens and a second axis intersecting said first axis;
   arranging each of said frames of said film a predetermined linear distance from an optical axis of said lens to create a plurality of angular exposure zones corresponding respectively to the plurality of said frames of said film; and for each of said plurality of angular exposure zones
   illuminating said frame of said film corresponding to said angular exposure zone for delivering an image exposure of said frame of said film to said periscope along said center of said angular exposure zone;
   removing a translation offset of said image exposure delivered to said periscope from said lens along said center of said angular exposure zone from said periscope to said print material by rotating said periscope about said first axis, thereby removing the offset but inducing a change in the length of the optical axis path; and
   rotating said periscope about said second axis to restore said optical axis path to its length before said translation of said image exposure.

2. The method as in claim 1 wherein said lens is a fast enlarging lens having a rectangularly shaped exit pupil.

3. The method as in claim 2 wherein the number of the plurality of frames and corresponding angular exposure zones is four.

4. The method as in claim 3 wherein said four angular exposure zones are, respectively, $+13°$ to $+6.5°$, $+6.5°$ to $0°$, $0°$ to $-6.5°$ and $-6.5°$ to $-13°$, all of said angular zones referenced in sign and magnitude from said lens optical axis.

5. A printer for three dimensional lenticular print material comprising:
   means for supporting a lenticular print material in a first imaging plane,
   means for supporting a plurality of exposed frames in a second imaging plane opposing said first imaging plane;
   a lens positioned above said frames for delivering an image exposure from said frames along an optical path from said frames through said lens to said print material;
   a periscope including first and second parallel mirrors positioned between said lens and said print material to direct said image exposure delivered by said lens to said print material, each of said parallel mirrors being rotatable about a first axis normal to the lens optical axis and a second axis intersecting said first axis;
   means for positioning each of said frames a corresponding predetermined linear distance from an optical axis of said lens to create a plurality of angular exposure zones corresponding respectively to the plurality of said frames; and
   means for illuminating each of said frames of said film for delivery of said image exposure by said lens, said lens being placed in the center of each angular exposure zone and delivering said image exposure of said corresponding frame along said center of said angular exposure zone to said periscope;
   said periscope removing the translation (offset) of said image exposure delivered from said lens along said center of said angular exposure zone to said print material by rotation thereof about said first axis, said removal thereby changing the length of said optical path, said periscope being rotated about said second axis after said translation to restore said optical path to its length before said offset removal.

6. The printer as in claim 5 wherein said lens is a fast enlarging lens having a rectangularly shaped exit pupil.

7. The printer as in claim 5 wherein the number of said frames and corresponding angular exposure zones is four.

8. The printer as in claim 5 wherein said four angular exposure zones are, respectively, $+13°$ to $+6.5°$, $+6.5°$ to $0°$, $0°$ to $-6.5°$ and $-6.5°$ to $-13°$, all of said angular zones referenced in sign and magnitude from said lens optical axis. How about the angular requirements of other print materials. 0.26 was an example only. Do we want to confine the claim to these angles?

9. The printer as in claim 5 wherein said plurality of frames is located on a continuous film.

* * * * *